United States Patent [19]
Monereau et al.

[11] Patent Number: 5,942,025
[45] Date of Patent: Aug. 24, 1999

[54] PROCESS AND INSTALLATION FOR THE TREATMENT OF A GASEOUS MIXTURE BY ADSORPTION WITH PRESSURE VARIATION

[75] Inventors: Christian Monereau, Paris; Dominique Rouge, Malakoff; Jean-Claude Calviac, Joinville le Pont, all of France

[73] Assignee: L'Air Liquide, Societe Anonyme Pour L'Etude et L'Explooitation des Procedes Georges Claude, Paris Cedex, France

[21] Appl. No.: 08/971,748

[22] Filed: Nov. 17, 1997

[30] Foreign Application Priority Data

Dec. 5, 1996 [FR] France .................... 96 14955

[51] Int. Cl.[6] ............................... B01D 53/053
[52] U.S. Cl. .................... 95/98; 95/101; 95/102; 95/105; 95/130
[58] Field of Search ............... 95/96–98, 100–105, 95/130

[56] References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 4,315,759 | 2/1982 | Benkmann | 95/98 X |
| 4,348,213 | 9/1982 | Armond | 95/103 |
| 4,589,888 | 5/1986 | Hiscock et al. | 95/130 X |
| 4,761,165 | 8/1988 | Stöcker et al. | 95/98 X |
| 4,925,461 | 5/1990 | Gemba et al. | 95/98 |
| 4,969,935 | 11/1990 | Hay | 95/130 X |
| 4,981,499 | 1/1991 | Hay et al. | 95/130 X |
| 5,015,272 | 5/1991 | Okada et al. | 95/100 X |
| 5,258,056 | 11/1993 | Shirley et al. | 95/97 X |
| 5,261,947 | 11/1993 | Hay et al. | 95/101 |
| 5,407,465 | 4/1995 | Schaub et al. | 95/102 X |
| 5,474,595 | 12/1995 | McCombs | 95/96 X |
| 5,520,720 | 5/1996 | Lemcoff | 95/96 |
| 5,565,018 | 10/1996 | Baksh et al. | 95/103 X |
| 5,656,065 | 8/1997 | Kalbassi et al. | 95/98 X |
| 5,711,787 | 1/1998 | Neill et al. | 95/96 |

*Primary Examiner*—Robert Spitzer
*Attorney, Agent, or Firm*—Young & Thompson

[57] ABSTRACT

A process for the treatment of a gaseous mixture by adsorption with variable pressure, in an adsorption installation comprising at least one adsorber. For each adsorber, there is a succession of steps defining an adsorption phase, a regeneration phase for the adsorbent comprising a depressurization step, and a pressure increase phase. The passage from one phase to the following comprises switching of at least one valve between open and closed positions. At least one valve switching is carried out according to a programmed progressive slope to control a first cocurrent decompression stage of the adsorber with transfer of gas toward a lower pressure portion of the installation. The transferred gas is sent, for at least partially balancing pressure, to another adsorber in a pressure increase phase.

7 Claims, 2 Drawing Sheets

5,942,025

PROCESS AND INSTALLATION FOR THE TREATMENT OF A GASEOUS MIXTURE BY ADSORPTION WITH PRESSURE VARIATION

CROSS REFERENCE TO RELATED APPLICATION

This application corresponds to French application 96 14955 of Dec. 5, 1996, the disclosure of which is incorporated herein by reference.

FIELD OF THE INVENTION

The present invention relates to a process for the treatment of a gaseous mixture by adsorption with pressure variation, of the type comprising, for an adsorber, a succession of stages which define, in a successive and cyclic manner, an adsorption phase, a regeneration phase of the adsorbent comprising a step of depressurization, and a phase of pressure increase, the passage from one phase to the other comprising switching of at least one valve.

The invention is applicable in particular to the production of oxygen from atmospheric air.

The pressures in question are absolute pressures, and the flow rates are molar flow rates.

SUMMARY OF THE INVENTION

The invention has for its object to reduce the expenditure of specific energy, as well as the unit cost of production, by a better handling of the phenomena of moving the adsorbent beds and the kinetic phenomena.

To this end, the invention has for its object a process of the mentioned type, in which at least one switching of the valve is carried out according to a progressive programmed slope to control a first cocurrent decompression stage of the adsorber with transfer of gas toward a unit of the installation at lower pressure.

According to one aspect of the invention, said valve switching is carried out according to a programmed progressive slope to transfer gas toward another adsorber in pressure increase phase, toward an auxiliary storage, or toward another adsorber for its countercurrent elution adjacent the low pressure of the cycle.

BRIEF DESCRIPTION OF THE DRAWINGS

An example of operation of the invention will now be described with respect to the accompanying drawing, in which.

DETAILED DESCRIPTION OF THE INVENTION

Figure 1:
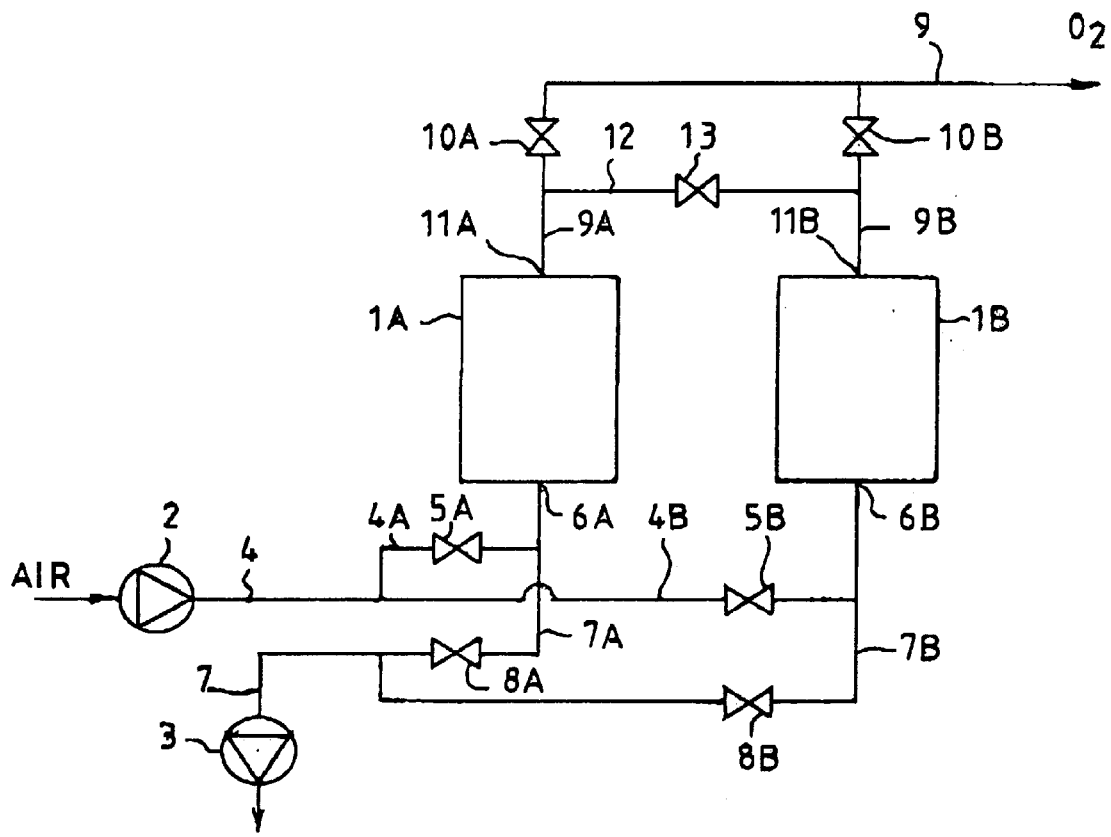
FIG. 1 shows schematically, by way of example, an installation for the production of oxygen according to the invention.

The installation of the VSA type shown in FIG. 1 is typically adapted to produce air enriched in oxygen, or impure oxygen (called "oxygen" for the sake of simplicity) with a content comprised preferably between about 90 and 95%, from atmospheric air.

Figure 2:
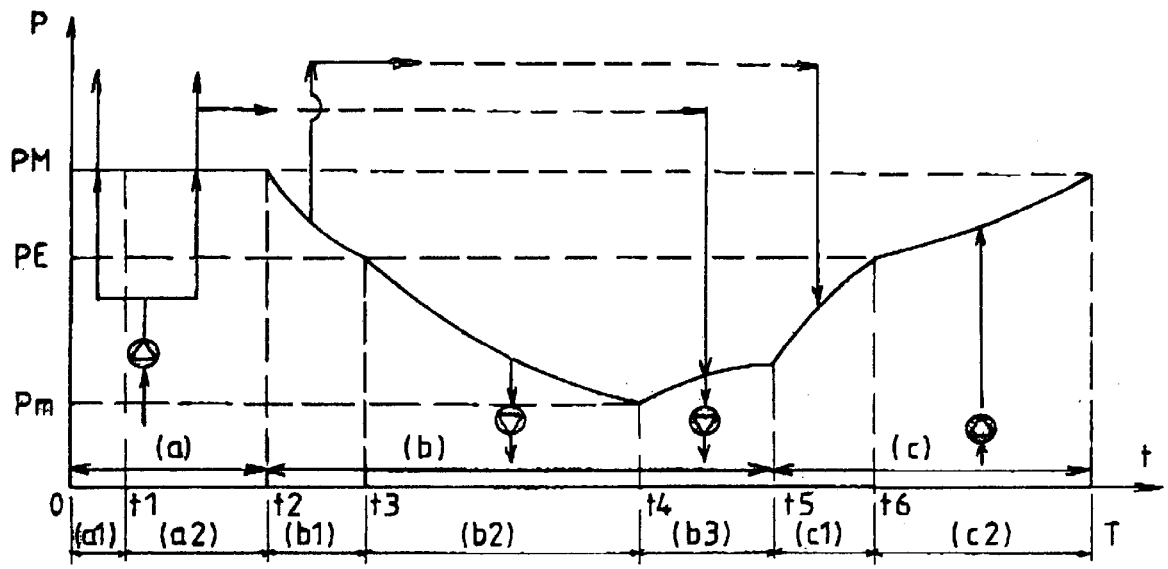
FIG. 2 is a diagram which illustrates an example of operating cycle with this installation.

In the illustrated embodiment, the installation comprises essentially two adsorbers 1A and 1B, a compressor 2, a vacuum pump 3 and an assembly of conduits and valves, as well as control and regulation means (not shown), suitable to practice the cycle illustrated in FIG. 2.

There is schematically shown in FIG. 1:

a supply conduit 4 for atmospheric air which leaves the output of the compressor 2 and which is divided into two branches 4A and 4B provided with respectively supply valves 5A, 5B and connected respectively to the lower input 6A, 6B of the adsorbers;

a purge/elution conduit 7 which is divided into two branches 7A, 7B provided with purge/elution valves 8A, 8B and leaving respectively the inputs 6A, 6B of the adsorbers;

a production conduit 9 which is divided into two branches 9A, 9B provided with production valves 10A, 10B and leaving respectively the upper outlets 11A, 11B of the adsorbers; and a balancing/elution conduit 12 which directly interconnects the outputs 11A and 11B and which is provided with a balancing/elution valve 13.

The intake of the compressor 2 and the output of the vacuum pump 3 are in communication with the surrounding atmosphere. The adsorbers 1A and 1B each contain at least one bed of an adsorbent adapted to adsorb selectively nitrogen from air, which is in this example a molecular sieve of the type CaA.

By means of the installation thus described, the adsorption cycle with pressure variation is practiced with vacuum (Vacuum Swing Adsorption or VSA) illustrated in FIG. 2.

In FIG. 2, in which the time t is given on the abscissa and the absolute pressure P on the ordinate, the lines indicated by arrows indicate the movements and destinations of the gaseous currents relative to an adsorber.

In the example in question, the high pressure PM of the cycle is slightly greater than atmospheric pressure, typically between 1.1 and $1.4 \times 10^5$ Pa, for example about $1.3 \times 10^5$ Pa, whilst the low pressure Pm of the cycle is substantially less than atmospheric pressure, typically between 0.3 and $0.5 \times 10^5$ Pa, for example about $0.4 \times 10^5$ Pa.

The cycle will be described below for one adsorber, namely adsorber 1A. The other adsorber 1B follows an identical cycle but offset timewise by a half-period T/2.

The cycle is constituted of the following successive steps:

(a) Adsorption phase (substantially isobaric):

(a1) From t=0 to t1, a first cocurrent adsorption step, in which the air to be treated is introduced via conduit 4 to the inlet of the adsorber near the pressure PM and circulates cocurrent through the latter. The production oxygen is withdrawn at the output of the adsorber and sent to the production conduit 9.

(a2) From t1 to t2, a second cocurrent adsorption step, which differs from the preceding only by the fact that a fraction of the produced oxygen is withdrawn at the outlet of the adsorber and is sent countercurrent into the other adsorber in the purge/elution stage (b3) described further on.

(b) Adsorbent regeneration chase:

(b1) From t2 to t3, a first cocurrent decompression step with pressure balancing with the other adsorber in the first countercurrent recompression phase (c1) described later. In the course of this step, the pressure of the adsorber falls from PM to an intermediate value PE.

(b2) From t3 to t4, a countercurrent purge step under vacuum. In the course of this step, the inlet of the adsorber is connected to the vacuum pump, which brings the pressure to the low pressure of the cycle Pm.

(b3) From t4 to t5, a purge/elution phase adjacent the low pressure PM. In the course of this step, the inlet of the adsorber is again connected to the vacuum pump, and, simultaneously, its output is connected to that of the other adsorber, which is undergoing the second adsorption phase (a2).

(c) Recompression Phase:

(c1) From t5 to t6, a first countercurrent recompression step by pressure balancing with the other adsorber in the course of first cocurrent decompression step (b1). At the time t6, the pressure has risen to the intermediate PE.

(c2) From t6 to T, a final cocurrent recompression step by means of air from the compressor. At time T, the pressure has returned to the vicinity of the value PM, and the cycle begins again.

By way of numerical example, the durations of the steps described above are successively 4 s, 10 s, 7 s, 20 s, 10 s, 7 s and 16 s.

The balancing/elution valve 13 is a valve with its opening programmed according to a predetermined slope.

Thus (FIG. 3), the control of the onset of the balancing step (b1), from time t2, takes place not by substantially instantaneously opening the valve 13 to its nominal opening, but by following a progressive opening slope which extends over a substantial fraction of the interval from times t2–t3 corresponding to this step.

Figure 3:
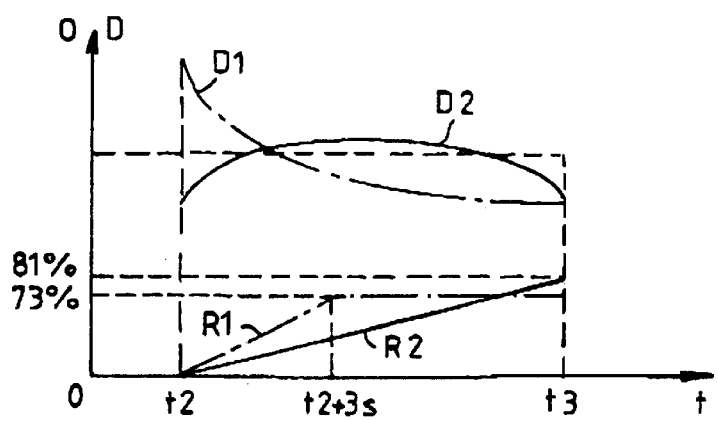
FIG. 3 is a diagram which illustrates on the one hand two different modes of operation of the balancing valve, and on the other hand corresponding variations of the flow rate which pass through it in the balancing phase.

There is shown in FIG. 3 two different slopes which have been tested on an industrial scale:

in broken line, a slope R1 which produces an opening increasing linearly from 0 to 73% of the nominal value, within 3 s, the opening then remaining equal to 73% to time t3; and in full line, a much more progressive slope R2 (of lower inclination), which represents an opening increasing linearly from 0 to 81% in 7 s (duration of step t2–t3 in the example in question).

There is also illustrated in FIG. 3 the variation of the instantaneous flow rate D which flows through the valve 13 in each of the two cases mentioned above:

In broken line, the curve D1=f(t) corresponding to the slope R1. This curve has a hyperbolic appearance, with a first half which descends abruptly and a second half, which is longer, which descends less abruptly. In this case, the quantity of gas which passes through the valve 13 during the first half of the interval from times t2–t3 is of the order of 70% of that which passes through the valve during all of this time interval.

In full line, the curve D2=f(t) corresponding to the slope R2. This curve has an elliptical appearance, with a first increasing half, a second half substantially constant and a second decreasing half. About 50% of the quantity of gas transferred during the time interval t2–t3 takes place in the course of the first half of this interval.

The technico-economic computations carried out in the two cases above, with a hypothesis of oxygen production of 93% purity, show that the productivity of the installation (quantity of oxygen produced per unit time and per unit volume of adsorbent) is greater in the case of the slope R2, and that, in the same case, the specific energy expenditure as well as the unit cost of the oxygen product are reduced.

Thus, a greater progressivity of the opening slope of the balancing/elution valve 13 improves the performance of the installation. The reduction in specific cost of the oxygen, relative to the use of a valve 13 which abruptly opens all the way, is of the order of 5%.

It is to be noted that, in the installation of FIG. 1, the valve 13 also serves as the elution valve. Accordingly, the purge/elution step can also be controlled with a progressive opening slope, identical to R2 or different. As a modification of the cycle of FIG. 2, the elution (3) can be carried out via the valve 13, with the gas from the first countercurrent decompression step via a storage chamber (not shown), and the first recompression step at least in part by the production gas.

What is claimed is:

1. In a process for the treatment of a gaseous mixture by adsorption with variable pressure, in an adsorption installation comprising at least one adsorber containing at least one bed of an adsorbent, and comprising, for each adsorber, a succession of steps defining in a cyclic manner, an adsorption phase, a regeneration phase for the adsorbent including a pressure decrease step, and a pressure increase phase, the passage from one phase to the following comprising switching of at least one valve between open and closed positions; the improvement in which the switching of said at least one valve is carried out according to a programmed progressive slope to control a first cocurrent pressure decrease step of the adsorber with transfer of gas toward a lower pressure portion of the installation.

2. Process according to claim 1, wherein the transferred gas is sent, for at least partially balancing pressure, to another adsorber in the pressure increase phase.

3. Process according to claim 1, wherein the transferred gas is sent to an auxiliary storage.

4. Process according to claim 1, wherein the transferred gas is sent to another adsorber for counter-current elution in the neighborhood of the low pressure of a cycle.

5. Process according to claim 1, wherein the programmed progressive slope is selected such that the quantity of gas which passes through the valve during the first half of the step it controls will be at most equal to 60% of that which passes through the valve during all of this step.

6. Process according to claim 5, wherein the slope is linear over all the duration of this step.

7. Process according to claim 1, for the production of oxygen from air.

* * * * *